United States Patent [19]

Mitchell

[11] Patent Number: 4,973,627

[45] Date of Patent: Nov. 27, 1990

[54] TIRE SIDEWALL COMPOSITION

[75] Inventor: Julian M. Mitchell, North Haven, Conn.

[73] Assignee: Uniroyal Chemical Company, Inc., Middlebury, Calif.

[21] Appl. No.: 420,965

[22] Filed: Oct. 13, 1989

[51] Int. Cl.$^5$ .......................... B60C 1/00; C08L 7/00; C08L 9/00

[52] U.S. Cl. .................... 525/211; 525/237; 152/525

[58] Field of Search ................. 525/211, 237; 152/525

[56] References Cited

U.S. PATENT DOCUMENTS

| | | |
|---|---|---|
| 3,179,718 | 4/1965 | Wei et al. ............................ 260/889 |
| 3,299,175 | 1/1967 | Marchesini et al. ................. 260/876 |
| 3,343,582 | 9/1967 | Himes et al. ......................... 152/330 |
| 3,524,826 | 8/1970 | Kresge et al. ............................. 260/5 |
| 3,678,135 | 7/1972 | Mastromatteo et al. ........... 260/889 |
| 3,817,952 | 6/1974 | Knabeschuh et al. ........... 260/80.78 |
| 3,830,274 | 8/1974 | Waser ................................... 152/355 |
| 3,897,405 | 7/1975 | Son et al. ............................. 260/79.5 |
| 3,915,907 | 10/1975 | Hopper ..................................... 260/5 |
| 3,936,430 | 2/1976 | Schoen et al. ..................... 260/80.78 |
| 3,937,862 | 2/1976 | Dillenschneider .................. 428/409 |
| 3,938,574 | 2/1976 | Burmester et al. ............. 152/330 R |
| 3,956,247 | 5/1976 | Landi et al. ........................... 526/42 |
| 4,008,190 | 2/1977 | Taylor et al. ............................ 260/5 |
| 4,017,468 | 4/1977 | Hopper ............................... 260/79.5 |
| 4,195,013 | 3/1980 | de Zarauz ......................... 260/42.33 |
| 4,202,801 | 5/1980 | Petersen ................................... 260/5 |
| 4,350,795 | 9/1982 | Bohm et al. ......................... 525/194 |
| 4,485,205 | 11/1984 | Fujimaki et al. .................... 524/526 |
| 4,645,793 | 2/1987 | Vom Hellems et al. .......... 525/211 |
| 4,804,028 | 2/1989 | Botzman ............................. 525/211 |
| 4,814,384 | 3/1989 | Mitchell et al. .................... 525/211 |

OTHER PUBLICATIONS

J. Walker et al., "Specialty Elastomers in Tires", Elastomerics, Sep. 1985, pp. 22-29.

Primary Examiner—Allan M. Lieberman
Attorney, Agent, or Firm—Raymond D. Thompson

[57] ABSTRACT

Tires having a sidewall composed of a composition formed by curing a blend comprised of (A) high molecular weight ($6 \times 10^5$ $\overline{Mu}$) ethylene/alphaolefin/nonconjugated polyene terpolymer; (B) a highly unsaturated rubber; and (C) a curative system comprised of sulfur and/or a sulfur-donor compound, an organic(hydro)peroxide curative and a sulfur cure accelerator exhibit desirable reduced internal heat buildup and improved adhesion to adjacent rubber carcass and tread portions of the tire.

9 Claims, No Drawings

TIRE SIDEWALL COMPOSITION

FIELD OF THE INVENTION

This invention relates to a tire having a sidewall composition formed by curing a blend comprised of (A) high molecular weight ethylene/alphaolefin/nonconjugated polyene terpolymer with a minimum molecular weight of $6.0 \times 10^5$; (B) a highly unsaturated rubber; and (C) a special curative system comprised of sulfur and/or a sulfur-donor compound, an organic (hydro)peroxide curative and a sulfur cure accelerator.

BACKGROUND OF THE INVENTION

The sidewalls of modern tires must meet performance standards which require a broad range of desirable properties. Thus, rubber compositions suitable for tire sidewalls should exhibit not only desirable strength and elongation, particularly at high temperatures, but also reduced heat buildup, low permanent set, excellent adhesion to adjacent portions of the cured tire. Additionally, good flex fatigue resistance and ozone and ultraviolet resistance are further requirements of all sidewall compositions.

It has been recognized that this complex balance of properties, required in the modern tire, cannot be satisfied by a single polymer and that, therefore, a blend of polymers must be employed. See, e.g., J. Walker et al, "Specialty Elastomers in Tires", *Elastomerics,* September 1985, pp. 22-29. It is noteworthy that all of the polymers employed in the blends described in such article possess a high degree of unsaturation. Consequently, such blends are readily vulcanized by the use of accelerated sulfur curative systems.

In the past, covulcanizates of EPDM and highly unsaturated rubbers have generally exhibited poor strength and high hysteresis when cured with conventional accelerated sulfur vulcanization systems. Accordingly, several different approaches have been undertaken to find a method of achieving a desirable covulcanization of blends of rubber of varying degrees of saturation, particularly blends of highly unsaturated rubbers and EPDM.

One frequently employed approach has been to halogenate the highly saturated rubber (typically "EPDM") thereby rendering a blend of such halogen-modified rubber with an unsaturated rubber sulfur curable. Thus, Schoen et al (U.S. Pat. No. 3,936,430) shows sulfur-curable blends of halogenated EPDM with unsaturated rubbers. (It is noteworthy that Schoen et al indicate at Column 4, lines 45-46 that the use of peroxide is "unnecessary".) Similarly, Hopper (U.S. Pat. No. 4,017,468) shows sulfur-curable blends of N-chlorothiocarboxylic amides or imides with unsaturated rubbers, whereas Kresge et al (U.S. Pat. No. 3,524,826) discloses sulfur-cured covulcanizates of brominated EPDM and highly unsaturated rubbers. In the same vein, Landi et al (U.S. Pat. No. 3,956,247) show a sulfur-curable blend of halogenated EPDM and diene rubber, and Hopper (in U.S. Pat. No. 3,915,907) shows sulfur curable blends of N-chlorothiosulfonamide-modified EPDM and diene rubbers.

Somewhat similarly, Son et al (in U.S. Pat. No. 3,897,405) show blends of (i) EPDM having —SH or —S—N linkages grafted thereto, with (ii) highly unsaturated rubbers, which blends are sulfur curable.

A second general approach taken to achieve the cocure of otherwise incompatible rubbers involves the use of a particular sulfur-cure accelerator or combination of sulfur-cure accelerators in conjunction with the use of sulfur. Thus, Mastromatteo et al (in U.S. Pat. No. 3,678,135) show the use of long chain hydrocarbon dithiocarbamate accelerators, such as zinc N-dodecyl,N-isopropyl dithiocarbamate in the sulfur cure of EPDM with highly unsaturated rubbers, while, similarly, Taylor et al (in U.S. Pat. No. 4,008,190) show the sulfur cure of EPDM with highly unsaturated diene rubbers employing a N,N-(higher alkyl)thiocarbamylsulfenamide as a vulcanization accelerator. In a similar manner, Hines et al (in U.S. Pat. No. 3,343,582) disclose a vulcanizable composition comprised of polyisoprene and EPDM, which composition contains as cure accelerators a benzothiazyl sulfide compound, an aryl-substituted guanidine and a thiuram sulfide.

Other approaches taken in the past to achieve such a cocure include that of Knabeschuh et al (in U.S. Pat. No. 3,817,952) which involves preparing a branched EPDM by heating EPDM with sulfur or a peroxide, and then blending such branched EPDM with a diene to form a sulfur or peroxide curable composition; that of Marchesini et al (U.S. Pat. No. 3,299,175) which employs the polymerization product of divinyl benzene and a vinyl unsaturated polymer as a filler for a peroxide-curable ethylene/alphaolefin copolymer (although Marchesini does state that sulfur can be employed in addition to peroxide, all Examples show peroxide only); and that of Wei et al (U.S. Pat. No. 3,179,718) which shows a vulcanized blend of nitrile rubber and ethylene/propylene copolymer which blend has been vulcanized employing both an organic peroxide and elemental sulfur. (It is noteworthy that Wei et al mentions neither EPDM nor sulfur cure accelerators.)

Both Bohm et al (U.S. Pat. No. 4,350,795) and Petersen (U.S. Pat. No. 4,202,801) show thermoplastic elastomers comprised of blends of a polyalphaolefin, EPDM and a conjugated diene rubber. While both these patents state that combination of sulfur and peroxide may be employed, Bohm et al show the use of sulfur only while Petersen exemplifies the use of peroxide only. Moreover, it is readily apparent that thermoplastic elastomers, due to their thermoplastic nature, are unsuitable for use as tire tread compositions.

U.S. Pat. No. 3,937,862 teaches the use in sidewalls of a mixed sulfur and peroxide vulcanization system (Example #23) with an EPDM polymer having a relatively low molecular weight (Mooney viscosity of 84 at 100° C.) and concludes that it is not of any particular advantage compared to an all peroxide vulcanization system.

The applicants have surprisingly and unexpectedly found that when a high molecular weight (at least $6.0 \times 10^5$ Mw) EPDM is utilized in a sidewall composition containing a three component cure system similar to the one in 3,937,862 that the ability of the sidewall composition to adhere to the adjacent carcass and tread compositions of the cured tire is dramatically improved. In addition, the internal heat buildup and Permanent set as measured in ASTM D623-78 method A are both dramatically improved over the results obtained using the lower molecular weight EPDM of 3,937,862.

Thus, it would be desirable to possess a tire having a sidewall composition which exhibits desirable strength and elongation as well as reduced heat buildup; low permanent set, excellent adhesion to adjacent portions of the cured tire.

Accordingly, it is an object of this invention to provide a tire having a sidewall composition which exhibits desirable strength and elongation as well as reduced heat buildup; low permanent set, excellent adhesion to adjacent portions of the cured tire.

It is a further object of this invention to provide a tire having a sidewall composition comprised of a covulcanizate of a highly unsaturated and high molecular weight saturated rubber.

These objects, and other additional objects will become more apparent from the following description and accompanying Examples.

DESCRIPTION OF THE INVENTION

This invention is directed to a tire having a sidewall composed of a composition formed by curing a blend comprised of:

(A) a terpolymer having a weight average molecular weight of $6.0 \times 10^5$ of:
  (i) ethylene,
  (ii) an alphaolefin of the formula $H_2C=CHR$ wherein R is an alkyl radical comprising from 1 to 10 carbon atoms, and
  (iii) a nonconjugated polyene;
(B) a highly unsaturated rubber; and
(C) a curative system comprised of:
  (i) one or more members selected from the group consisting of sulfur and sulfur-donor compounds;
  (ii) an organic peroxide curative; and
  (iii) a sulfur cure accelerator.

As is employed in the specification and claims herein, the term "organic peroxide" includes hydroperoxide curatives as well as peroxide curatives.

The tire sidewall compositions of the tires of this invention are formed by curing blends of (A) ethylene/alphaolefin/nonconjugated polyene terpolymer and (B) a highly unsaturated rubber.

The ethylene/alphaolefin/nonconjugated polyene terpolymers, i.e., Component (A), which may be employed are terpolymers of ethylene, at least one alphaolefin (of the formula $H_2C=CHR$, wherein R is a linear or l0 branched alkyl radical comprised of from 1 to 10 carbon atoms) and at least one copolymerizable nonconjugated polyene. Preferably, in the formula above, R is a $C_1$–$C_8$ alkyl radical. The most preferred alphaolefins are propylene, 1-butene and 1-pentene, with propylene being particularly preferred.

Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endo-dicyclopentadiene and the like; exo- and endo-alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene to alphaolefin weight ratio of the ethylene/alphaolefin/nonconjugated polyene terpolymers which may be employed in the present invention is generally between about 25:75 and about 85:15, is preferably between about 40:60 and about 80:20, and is most preferably between about 60:40 and about 80:20. The polyene content of such terpolymers is generally below about 25%, and is preferably between about 1 and about 15% by weight.

Representative of the highly unsaturated rubbers which may be employed in the practice of this invention are diene rubbers. Such rubbers will typically possess an iodine number of between about 100 and about 250, although highly unsaturated rubbers having a higher or a lower (e.g., of 50–100) iodine number may also be employed. Illustrative of the diene rubbers which may be utilized are polymers based on conjugated dienes such as 1,3-butadiene; 2-methyl-1,3-butadiene; 1,3-pentadiene; 2,3-dimethyl-1,3-butadiene; and the like, as well as copolymers of such conjugated dienes with monomers such as styrene, alpha-methylstyrene, acrylonitrile, methacrylonitrile, methyl acrylate, ethyl acrylate, methyl methacrylate, ethyl methacrylate, vinyl acetate and the like. Preferred highly unsaturated rubbers include natural rubber, cis-polyisoprene, polybutadiene, poly(styrene-butadiene) and poly(acrylonitrile-butadiene). Moreover, mixtures of two or more highly unsaturated rubbers may be employed.

The curative system employed in the cure of the sidewall composition of this invention comprises sulfur and/or a sulfur donor compound, at least one sulfur cure accelerator and at least one organic peroxide curative.

The sulfur donor compounds which may be employed in conjunction with or in the alternative to sulfur are well known to those skilled in the art of rubber compounding. Illustrative of such sulfur donor compounds are 2-(4-morpholinyldithio)benzothiazole, tetramethylthiuram disulfide, tetraethylthiuram disulfide, dipentamethylene thiuram hexasulfide, N,N'-carpolactam disulfide and the like.

The sulfur cure accelerators which may be employed include thioureas, such as N,N'-dibutylthiourea, 2-mercaptoimidazoline, tetramethylthiourea and the like; guanidine derivatives, such as N,N'-diphenylguanidine and the like; xanthates, such as zinc dibutylxanthate and the like; dithiocarbamates, such as zinc dimethyldithiocarbamate, zinc diethyldithiocarbamate, zinc dibutyldithiocarbamate, sodium diethyldithio-carbamate, and the like; thiuramsulfides, such as dipentamethylenethiuram disulfide, dipentamethylenethiuram hexasulfide, tetrabutylthiuram monosulfide, tetramethylthiuram monosulfide, tetraethylthiuram monosulfide, tetraethylthiuram disulfide and the like; heterocyclics, such as mercaptobenzimidazole, mercaptobenzthiazole, 2,2'-dibenzothiazyl disulfide, zinc 2-mercaptobenzothiazole and the like; and sulfenamides, such as N-oxydiethylene-2-benzothiazolesulfenamide, N-t-butylbenzo-thiazylsulfenamide, N-cyclohexyl-2-benzothiazylsulfenamide, N,N-diisopropyl-2-benzothiazylsulfenamide and the like. Moreover, mixtures of two or more sulfur cure accelerators may be employed in the curing agent of this invention. The preferred accelerators are thiazoles and sulfenamides, with sulfenamides being particularly preferred.

Illustrative of the peroxides which may be employed are benzoyl peroxide, 1,3-bis(t-butylperoxyisopropyl) benzene, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3- yne, 4-methyl-2,2-di-t-butylperoxypentane and the like. Mixtures of two or more peroxides may also be employed. The preferred peroxides are dicumyl peroxide and 2,5-dimethyl-2,5-di-t-butylperoxyhexane.

Typically, between about 0.5 and about 200, preferably between about 5 and about 150, and most preferably between about 6 and about 14, gram atoms of sulfur per mole of peroxide are present in said curing agent.

The sulfur cure accelerator is generally present in amounts of between about 0.1 gram and about 5 grams per 100grams of rubber, with preferably between about 0.3 gram and about 3.0 grams of accelerator per 100 grams of rubber being present. Most preferably, between about 0.3 gram and about 1.0 gram of accelerator per 100 grams of rubber are employed.

Generally, between about 0.2 and about 5, preferably between about 0.5 and about 3, and more preferably between about 0.5 and about 1.5 grams of sulfur per hundred grams of rubber are employed. Employing the ratios of sulfur to peroxide stated above, one skilled in the art can easily calculate the corresponding amount of the particular peroxide which is to be employed.

The weight ratio of ethylene/alphaolefin/nonconjugated polyene terpolymer to highly unsaturated rubber will generally vary between about 10:90 and about 90:10. Ratios of between about 30:70 and about 50:50 are preferred, although, as will be recognized by one skilled in the art, the preferred ratio will vary with the particular use to which the tread is to be applied.

In addition to the ethylene/alphaolefin/nonconjugated polyene terpolymer, the highly unsaturated rubber and the three-component curing agent described above, the tread composition of the tire of this invention may further comprise zinc oxide, reinforcing agents, fillers, processing aids, extender oils, plasticizers, antidegradients, and the like, all of which additional components are well known to those skilled in the rubber art.

Preferably, between about 2 and about 10 grams of zinc oxide per hundred grams of rubber are employed, although amounts in excess of 10 grams may also be employed. Most preferably, between about 3 and about 5 grams of zinc oxide per 100 grams of rubber are present.

The tread composition of this invention is typically compounded by first mixing all the ingredients except the curative composition in a suitable mixing device (such as a Banbury [trademark] type internal mixer, a two roll mill, or the like). Such mixing will typically require about 5 minutes, although shorter or longer mixing periods may be employed. This mixing may be performed at temperatures ranging from room temperature or cooler up to about 150° C. or higher. If mixing temperatures above the activation temperature of the curing agent are employed, upon completion of the mixing the blended rubber is cooled or allowed to cool to a temperature below such activation temperature.

The curative composition is then incorporated into the blend by subsequent mixing or milling.

Alternatively, the blend of this invention may be compounded by formulating a terpolymer component and an unsaturated rubber component and blending desired amounts of the two components together. In this alternative embodiment, the location of the elements of the curative composition (i.e. the peroxide, sulfur and sulfur cure accelerator) is not critical, with any or all such elements being blended in either component or both.

The blended composition may then be extruded through a suitable die to form an uncured sidewall slab which is used by means well known to those skilled in the art to produce the tires of this invention.

The tires of this invention possess a sidewall composition exhibiting desirable reduced heat buildup; low permanent set, excellent adhesion to adjacent Portions of the cured tire.

EXAMPLES

The following Examples are intended to further illustrate the invention and are not intended to limit the scope of the invention in any manner.

Examples 1-3 and Comparative Experiments A-D

Employing the ingredients indicated in Table 1 (which are listed in parts per hundred of rubber by weight), several rubber compositions were compounded in the following manner: Elastomers, extender oil (Naphthenic Oil, Circosol, 4240), carbon black, zinc oxide, stearic acid and an antidegradant (if any) in the amounts listed in Table 1 were charged in a Banbury type B internal mixer. Mixing was continued until the temperature reached 154° C., then the mixing was stopped and the inside of the mixer was swept. Blending was then resumed for one more minute and the stock was removed from the mixer. The curative ingredients were incorporated in the cooled rubber stocks on a mill, with care being taken not to exceed 105° C. stock temperature. The compounded stock was then sheeted out and samples were cut for cure. The samples were cured for 10 minutes at 170° C. and their physical properties evaluated. The results of such testing is not reproduced since all stress-strain properties were within acceptable ranges for tire sidewall compounds and aged physical properties were similarly within acceptable ranges.

| | TABLE OF POLYMERS | | | | |
|---|---|---|---|---|---|
| | $EPDM^1$-Hi $\bar{M}w$ | $EPDM^2$-Hi $\bar{M}w$ | $EPDM^3$-Low $\bar{M}w$ | $EPDM^4$-Low $\bar{M}w$ | $EPDM^5$-Low $\bar{M}w$ |
| Ethylene/Propylene (weight ratio) | 68/32 | 69/31 | 57/43 | 57/43 | 57/43 |
| $\bar{M}w \times 10^5$ | 6.3 | 8.5 | 3.5 | 3.9 | 4.3 |
| $\bar{M}n \times 10^5$ | 2.2 | 3.6 | 1.2 | 1.5 | 1.6 |
| $\bar{M}w/\bar{M}n$ | 2.8 | 2.4 | 3.1 | 2.6 | 2.8 |

All polymers are 5-ethylidene-2 norbornene polymers and the Mw data is from G.P.C. $EPDM^1$ and $EPDM^2$ have 50 and 75 parts by weight of oil, however, in all formulations reported herein the oil is listed separately and only the polymer weight is shown in the formulation. For example, if 60 parts of $EPDM^1$ is added, that is reported as 40 parts polymer and 20 parts oil.

The portion of Table 1 labeled Static Adhesion to tread properties shows the dramatically improved adhesion to dissimilar tread compound ($T_1$) of the high molecular weight EPDM of this invention (Examples 1-3) compared to the lower molecular of the prior art of U.S. Pat. No. 3,937,862. This patent in Example 23 teaches the use of a mixed vulcanization system of sulfur, peroxide and accelerator with a low molecular weight EPDM-Epsyn 55 (Trademark of Copolymer rubber and chemical). Epsyn 55 is an ethylene/propylene/ethylidenenorbornene terpolymer having a Mw of $3.7 \times 10^5$, and Mn of $1.6 \times 10^5$. The Mw/Mn ratio is 2.4 and intrinsic viscosity in decalin at 135° C. is about 1.7. All the comparative examples A-D contain EPDM polymers (EPDM[3], EPDM[4], EPDM[5]) are very similar to Epsyn 55. EPDM[4] in the foregoing Table of Polymers is considered to be identical to the Epsyn 55 used in U.S. Pat. No. 3,937,862.

The static adhesion values show a marked improvement in that the high molecular weight EPDM[1] and EPDM[2] exhibit A "Stock Tear" rating which is very desireable in tires.

The rating for all of the low molecular weight EPDM's showed "INT" or "INTERFACIAL SEPARATION" which connotes an adhesive failure at the interface between the test composition and the standard tread formulation. This is unacceptable in tire technology since such inter-compound weakness leads to ply separation and failure during the service life of the tire. Examples 4-7 also show the excellent adhesion of the high molecular weight tricure compounds to several typical tire carcass compounds. These will be discussed elsewhere in detail.

The compounds are those identified in Table 1. Comparative Example C shows higher heat buildup and percent permanent set than the compound with high molecular weight EPDM. Similarly comparative Example D was much higher on both properties than the compounds of the invention. Examples 1 and 3 utilized EPDM having molecular weights of $6.3 \times 10^5$ and $8.5 \times 10^5$ respectively while Comparative D had a molecular weight of $4.3 \times 10^5$. This clearly shows the advantage of the high molecular weight EPDM with the cure system of the invention.

EXAMPLES 4-7

Adhesion to Carcass Test Compounds

The compound of Example 2 of the invention was plied up with the carcass test compounds $C_1$-$C_4$ into test pads which were cured for 20 minutes at 176° C. The cured pads were then pulled apart at 125° C. The force required to separate the two stocks was recorded in pounds per linear inch and the test pad was examined visually to determine whether the failure was an undesireable adhesive failure at the interface between the two stocks (designated "Int" for Interfacial Separation) or a desireable cohesive failure within one of the stocks. (Designated "ST" for Stock Tear). Stock Tear indicates that the failure was controlled only by the physical strength limitations of one of the compounds and that no separation occurred between the two dissimilar compounds. Table 3 summarizes the results.

TABLE 1

|  | A | B | C | D | 1 | 2 | 3 |
|---|---|---|---|---|---|---|---|
| SMR 5CV | 60 | 60 | 60 | 60 | 60 | 60 | 60 |
| EPDM[4]-Lo-Mw | 40 | 40 |  |  |  |  |  |
| EPDM[5]-Lo-Mw |  |  |  | 40 |  |  |  |
| EPDM[3]-Lo-Mw |  |  | 40 |  |  |  |  |
| EPDM[2]-Hi-Mw |  |  |  |  |  | 40 | 40 |
| EPDM[1]-Hi-Mw |  |  |  |  | 40 |  |  |
| CARBON BLACK | 35[a] | 35[a] | 50[b] | 45[c] | 45[c] | 50[b] | 45[c] |
| OIL | 8 | 8 | 20 | 12 | 29 | 35 | 37 |
| ZINC OXIDE | 5 | 5 | 3 | 5 | 5 | 3 | 5 |
| STEARIC ACID | 1 | 1 | 2 | 1.5 | 1.5 | 2 | 1.5 |
| DELAC MOR[d] |  |  |  |  |  | .85 |  |
| DELAC S[e] | 0.5 |  |  |  |  |  |  |
| ANTIOZONANT | 1 | 1 |  | 3 | 3 |  | 3 |
| DELAC NS[f] |  |  | .85 | .85 | .85 |  | .85 |
| PEROXIDE | 1 | 1.4 | .6 | .6 | .6 | .6 | .6 |
| SULFUR (80%) | .4 | .3 | 1.5 | 1.5 | 1.5 | 1.5 | 1.5 |
| STATIC ADHESION TO TREAD @ 250° F. (POUNDS PER LINEAR INCH) | 19 | 8 | 11 | 12 | 57 | 130 | 113 |
| *RATING | INT | INT | INT | INT | ST | ST | ST |

[a]N-550
[b]N-660
[c]N-326
[d]N-cyclohexyl-2-benzo-thiazole-sulfenamide
[e]2-(morpholinothio)-benzo-thiazole
[f]N-t-butyl-2-benzothiazole-2-sulfenamide
*INT = Undesireable Interfacial Adhesive Failure ST = Stock Tear, Cohesive Tear Very Desireable

TABLE 2

| | Internal Heat Buildup | | | | |
|---|---|---|---|---|---|
| | Carbon Black | | | | |
| | N-660 | | N-326 | | |
| Example | C | 2 | D | 1 | 3 |
| ΔT, °C. | 98 | 81 | 121 | 82 | 75 |
| % Set | 7.0 | 5.7 | 12.2 | 8.0 | 5.9 |

Internal Heat Buildup was evaluated using a Goodrich Flexometer 150 psi load 0.25 inch stroke. ASTM-D623(78) Method A.

It is known that internal heat buildup is affected directly by the type of carbon black in the compound. In order to eliminate the variation, Table 2 shows results high and low molecular weight EPDM's using identical carbon blacks with the cure system of the invention.

TABLE 3

| | Adhesion To Carcass Compounds | | | |
|---|---|---|---|---|
| EXAMPLE | 4 | 5 | 6 | 7 |
| Test Pad Composition | C[1] Ex 2/Ex C | C[2] Ex 2/ExC | C[3] Ex 2/Ex C | C[4] Ex 2/Ex C |
| Static Adhesion, pli | 50    8 | 110    11 | 100    8 | 78    8 |
| Rating | ST   INT | ST   INT | ST   INT | ST   INT |

TABLE 4

| | Effect of Curatives | | | |
|---|---|---|---|---|
| Example | Accelerator** | Peroxide* | Sulfur | ADHESION, pli Rating |
| 8 | 1.75 | 3.0 | 1.75 | 24/ST |
| 9 | .5 | 5.0 | 0.5 | 18/ST |
| 10 | 1.75 | 3.0 | 1.75 | 22/ST |
| 11 | .5 | 3.0 | 0.5 | 50/ST |
| 12 | 1.75 | 5.0 | 0.5 | 18/ST |
| 13 | 1.75 | 1.0 | 0.5 | 91/ST |
| 14 | 3.0 | 1.0 | 1.75 | 17/ST |
| 15 | 1.75 | 1.0 | 3.0 | 26/ST |
| 16 | .5 | 1.0 | 1.75 | 37/ST |
| 17 | .5 | 3.0 | 3.0 | 53/ST |
| 18 | 1.75 | 3.0 | 1.75 | 28/ST |
| 19 | 3.0 | 3.0 | .5 | 34/ST |
| 20 | 1.75 | 5.0 | 3.0 | 10/INT |
| 21 | 3.0 | 3.0 | 3.0 | 6/INT |
| 22 | 3.0 | 5.0 | 1.75 | 7/INT |

*Dicup 60 (60% Active) (TM of Hercules, Inc.)
**N-t-butyl-2-benzothiazole-2 sulfenamide

EXAMPLES 8-22

Effect of Curative Levels

A series of cure system variations were run covering a broad range of levels of each of the critical cure components of the invention; sulfur; peroxide; and a sulfur cure accelerator. The test formulation is the same as Example 2 of Table 1 except for the last three cure ingredients which are variable in this study. The high molecular weight EPDM² Hi-Mw was utilized. Table 4 summarizes the static adhesion results with tread formulation $T_1$. The test regime and sample preparation is identical to the one described for Examples 4–7. The level of static adhesion is high enough to cause the desireable stock tear (ST) phenomenon in which one of these stocks fails internally before the bond between the dissimilar stocks is broken. This type of strong bond is critical in a tire construction to assure that no interfacial separation occurs between the sidewall compound and the adjacent tread and carcass compounds. Examples 22–24 showed interfacial separation but those failures were attributable to the extremely high level total curative (9 to 10 parts of curative). These stocks were probably over cured and not characteristic of a typical rubber cure system.

What is claimed is:

1. A tire having a sidewall having reduced internal heat buildup and improved cured adhesion comprising a cured blend of:
   (a) a terpolymer of ethylene/propylene/nonconjugated polyene having a weight average molecular weight greater than or equal to $6.0 \times 10^5$;
   (b) a highly unsaturated rubber, wherein the weight ratio of component (a) to component (b) is between about 10:90 and about 90:10; and
   (c) a curative system comprised of:
      (i) about 0.2 to about 5 parts by weight based on the combined weight of (a) and (b) of one or more members selected from the group consisting of sulfur and sulfur-donor compounds;
      (ii) an organic peroxide curative; and
      (iii) about 0.1 to about 5 parts by weight based on the combined weight of (a) and (b) of a sulfur cure accelerator, wherein between about 0.5 and about 200 gram atoms of (i) per mole of (ii) is present.

2. The tire of claim 1 wherein said terpolymer has a weight average molecular weight of greater than or equal to $6.3 \times 10^5$.

3. The tire of claim 2 wherein said curative system component (c) (i) is sulfur.

4. The tire of claim 1 wherein said nonconjugated polyene is selected from the group consisting of 5-ethylidene-2-norbornene, 1,4-hexadiene and dicyclopentadiene.

5. The tire of claim 1 wherein said highly unsaturated rubber is selected from the group consisting of natural rubber, cis-polyisoprene, polybutadiene, poly(styrene-butadiene), and poly(acrylonitrile-butadiene).

6. The tire of claim 1 wherein said sulfur cure accelerator is selected from the group consisting of thiazole and sulfenamides.

7. The tire of claim 6 wherein said sulfur cure accelerator is a sulfenamide.

8. The tire of claim 1 wherein the weight ratio of component (a) to component (b) is between about 30:70 and about 50:50.

9. A tire having a tread composed of a composition formed by curing a blend comprised of:
   (a) a terpolymer having a weight average molecular weight greater than or equal to $6.0 \times 10^5$ and composed of:
      (i) ethylene,
      (ii) propylene, and
      (iii) at least one member of the group consisting of 5-ethylidene-2-norbornene, 1,4-hexadiene and dicyclopentadiene;
   (b) at least one member of the group consisting of natural rubber, cis-polyisoprene, polybutadiene poly(acrylonitrile-butadiene); and
   (c) a curative system comprised of:
      (i) about 0.2 to about 5 parts by weight based on the combined weight of (a) and (b) of one or more members selected from the group consisting of sulfur and sulfur-donor compounds;
      (ii) an organic peroxide curative, and (iii) about 0.1 to about 5 parts by weight based on the combined weight of (a) and (b) of at least one member selected from the group consisting of thiazoles and sulfenamides;

wherein the weight ratio of component (a) to component (b) is between about 10:90 and about 90:10 and between about 0.5 and about 20 gram atoms of c(i) per mole of c(ii) is present.

* * * * *